United States Patent [19]

Rosenthal

[11] Patent Number: 4,601,002

[45] Date of Patent: Jul. 15, 1986

[54] DIGITAL TECHNIQUE FOR CONSTRUCTING VARIABLE WIDTH LINES

[75] Inventor: Richard L. Rosenthal, Alexandria, Va.

[73] Assignee: The United States Army Corps of Engineers as represented by the Secretary of the Army, Washington, D.C.

[21] Appl. No.: 456,159

[22] Filed: Jan. 6, 1983

[51] Int. Cl.$^4$ ............... G06F 15/40; G06F 15/626
[52] U.S. Cl. .................... 364/518; 340/739; 364/520; 382/55
[58] Field of Search .............. 364/518–522, 364/723; 382/54, 55; 340/722, 730, 739

[56] References Cited

U.S. PATENT DOCUMENTS

| | | | |
|---|---|---|---|
| 4,062,648 | 12/1977 | Hennessee | 364/520 X |
| 4,135,245 | 1/1979 | Kemplin et al. | 364/520 |
| 4,259,725 | 3/1981 | Andrews et al. | 364/521 |
| 4,283,765 | 8/1981 | Rieger | 364/521 |
| 4,298,945 | 11/1981 | Kyte et al. | 364/521 X |
| 4,477,803 | 10/1984 | Conrad | 340/722 |

FOREIGN PATENT DOCUMENTS 0807365 2/1981 U.S.S.R. ............... 340/722

OTHER PUBLICATIONS

Computers & Digital Techniques, Feb. 1979 (vol. 2, No. 1), "Zone Management Processor: A Module for Generating Surfaces in Raster-Scan Colour Displays", R. L. Grimsdale et al., pp. 21-25.
Computer Graphics & Image Processing, Aug. 1979 (vol. 10, No. 4) pp. 348-365, "On the Properties of Discrete Circles, Rings, & Disks".
Computer Graphics & Image Proc., Aug. 1979 (vol. 10, No. 4), "Algorithms for Generation of Discrete Circles, Rings, & Disks", pp. 366-371.

Primary Examiner—Errol A. Krass
Assistant Examiner—Kevin J. Teska
Attorney, Agent, or Firm—Darrell E. Hollis

[57] ABSTRACT

A method for digitally constructing variable width cartographic lines, the invention provides an algorithm for generating symbolized lines using multiply-stroked centerline data. The algorithm allows generation of software which utilizes trigonometric functions and which can be implemented in applications using vector data with vector or raster plotters. The algorithm further accounts for basic cartographic principles, existing algorithm characteristics and hardware constraints imposed by specific output devices.

20 Claims, 4 Drawing Figures

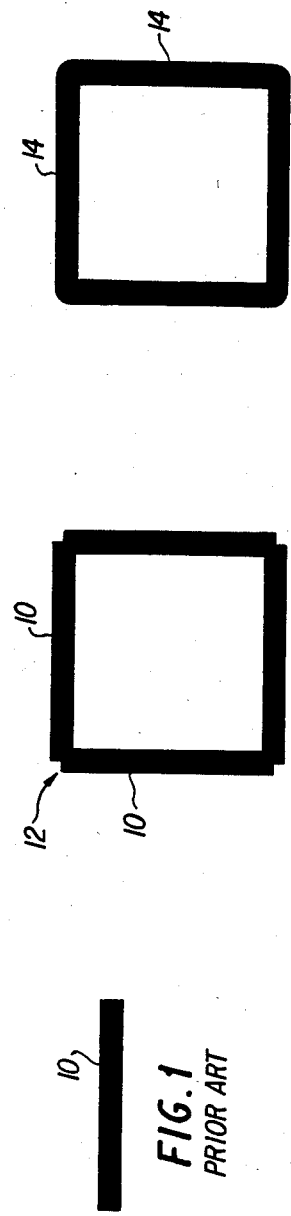
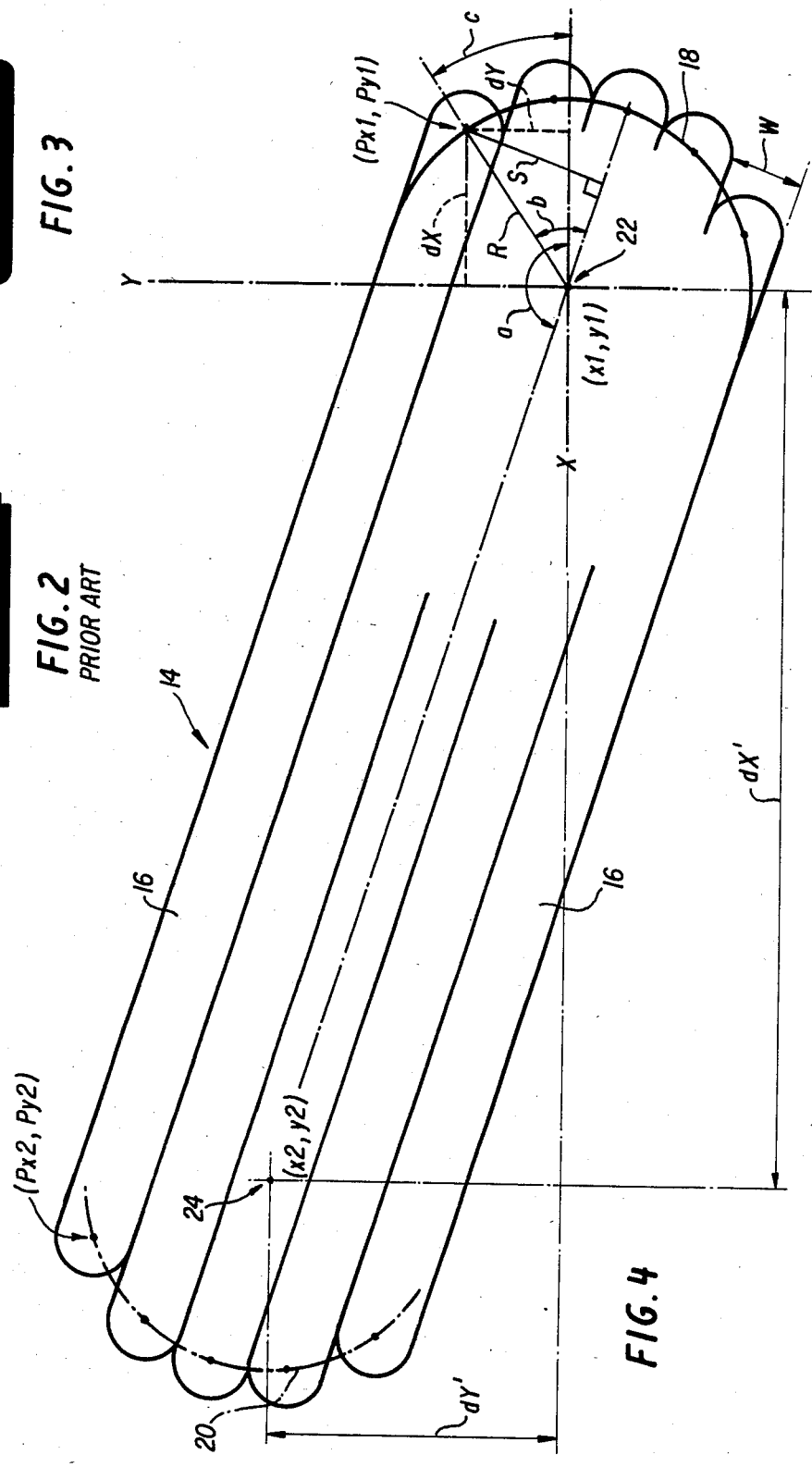

DIGITAL TECHNIQUE FOR CONSTRUCTING VARIABLE WIDTH LINES

BACKGROUND OF THE INVENTION

1. Field of the Invention

The invention relates generally to construction of lines in cartographic applications by software simulation and particularly to a method for digitally constructing minimum width and variable width lines via vector-to-raster conversion.

2. Description of the Prior Art

Generation of map images by automated equipment often requires that lines of differing widths be produced. Equipment commonly referred to as vector equipment provides this capability in an essentially mechanical fashion through the hardware employed and includes such options as pen selection on pen plotters or aperture selection on photoplotters. When utilizing graphic devices operable by binary raster output, these hardware options are not available, such equipment requiring the generation of line widths by software simulation. A primary difficulty encountered with such equipment in the specific field of cartographic symbolization is that lines generated by software simulation typically do not meet necessary standards. The deficiencies of the prior art become of even greater moment in view of recent developments in the use of output devices for vector data which involves the generation of lines in raster form using vector-to-raster conversion. Given such advances in the state of the art relative to the generation of cartographic lines in automated image generation, it has become imperative that the ability to control the quality of line widths generated by software simulation be improved.

The prior art as represented by issued United States patents does not provide such improvement with even those devices closest in function to the present problem being of little assistance in meeting cartographic requirements. In particular, Kemplin et al, in U.S. Pat. No. 4,135,245, describe an X-Y plotter having a programmable pen changer. However, the Kemplin et al device is not useful in the generation of variable width cartographic lines by software simulation. Rieger, in U.S. Pat. No. 4,283,765, teaches the use of a matrix multiplier for rotation, scaling, shearing, and stretching of three-dimensional caligraphic images with particular application to incremental vector generators. Andrews et al, in U.S. Pat. No. 4,259,725, disclose a system for displaying a rasters-scanned image on a screen wherein signals are also fed for causing a cursor having distinctive light intensity to be overlayed on the image. Andrews et al further disclose programs for defining multiple cursors which are stored in a readable memory. As a further example of the prior art, Hennessee, in U.S. Pat. No. 4,062,648, discloses a plotter system having an adaptive velocity device for improving plotted line quality by selectively varying the velocity of the plot head. However, the systems of the prior art do not provide the ability to construct variable-width cartographic lines through software simulation and which is of a quality adequate to the requirements of the generation of map images.

The present invention provides a technique for generating lines via vector-to-raster conversion wherein the lines have a minimum distinguishable width associated with cartographic production, the invention further allowing the generation of variable-width lines in addition to the generation of lines of minimum width.

SUMMARY OF THE INVENTION

The invention provides a digital technique for constructing variable-width cartographic lines and includes an algorithm developed to generate symbolized lines using multiply-stroked centerlines data. The invention particularly improves the quality of lines generated by software simulation to the level necessary to maintain the standards of cartographic symbolization. In the automated map image generation environment such as exists for example in the United States Army Engineer Topographic Laboratory, the requirement exists for simulating line widths on binary raster devices, this requirement being related to the development of devices such as the Large-Format Laser Platemaker. Use of devices such as the Large-Format Laser Platemaker as output devices for vector data involve the generation of lines in raster form using vector-to-raster conversion. Software used in this conversion process commonly creates a series of single pixels for each vector. Present vector data output devices are excessively fine when generating single pixel vectors, a line created from single pixels typically having a width of only 1.5 mils. Since lines of such widths are not distinguishable, the present technique particularly intends the generation of lines via vector-to-raster conversion which have a minimum distinguishable width associated with cartographic production, this width being on the order of 4 to 5 mils. The present invention particularly provides for the generation of lines of variable width in addition to the generation of lines of minimum width.

The present digital technique particularly improves upon prior binary raster devices such as electrostatic plotters and the software packages provided therewith which cause such binary raster devices to be compatible with basic pen plotter software. In such situations, the vector-to-raster conversion involved is commonly used by the applications programmer. Such software packages often contain additional routines which take advantage of the capablilities afforded by raster plotting including the generation of variable-width lines. Typically, the variable-width lines generated are derived from multiply-stroked centerline data. Subsequent vector-to-raster conversion utilizes the additional "strokes" and generates a single pixel line for each stroke. Algorithms thus employed generate variable width lines by repeatedly plotting the centerline data parallel to itself at a distance equal to the step size between two adjacent pixels. Each stroke is thus the same length as the centerline which causes gaps to form at vertices of rectangular line segments intersecting at angles to each other. The algorithm utilized according to the present invention generates lines which more closely resemble those lines produced by traditional drafting techniques by variation of the length of the strokes based from the centerline.

Accordingly, it is a primary object of the present invention to provide a digital technique for constructing variable-width cartographic lines and which includes an algorithm developed for generating symbolized lines using multiply-stroked centerline data.

It is another object of the invention to provide a method for generating variable-width lines from multiply-stroked centerline data and wherein the lines more closely resemble lines produced by traditional drafting techniques such that intersecting lines are not gapped at the vertices.

It is a further object of the present invention to provide a digital technique for generating lines via vector-to-raster conversion which have a minimum distinguishable width and which permits generation of variable-width lines of a quality associated with cartographic production and particularly automated map image generation.

Further objects and advantages of the present invention will become more readily apparent in light of the following detailed description of the preferred embodiments.

BRIEF DESCRIPTION OF THE DRAWINGS

FIG. 1 is a diagrammatical representation of a single line such as is generated according to the prior art;

FIG. 2 is a diagrammatical representation of the connection of the lines such as that shown in FIG. 1;

FIG. 3 is a diagram illustrating the connection of lines generated according to the present invention; and FIG. 4 is a diagrammatical view illustrating the particular technique of the present invention for generating cartographic lines.

DESCRIPTION OF THE PREFERRED EMBODIMENTS

Referring now to the drawings, and particularly to FIGS. 1-3, a line is seen at 10 to have been generated by conventional equipment such as binary raster devices controlled by software. The line 10 is substantially rectangular in geometrical conformation and is typical of lines generated by the capabilities afforded by raster plotting such as occurs through vector-to-raster conversion processes and wherein lines are generated from multiply-stroked centerline data. The vector-to-raster conversion process utilizes what is known as additional "strokes" to generate a single pixel line for each stroke. Algorithms used in such situations thus repeatedly plot the centerline data parallel to itself at a distance equal to the step size between two adjacent pixels. Since each stroke is the same length as the centerline, the resultant symbolized line 10 has a rectangular appearance as noted in the drawing. Due to proximity, the multiple single-pixel raster lines give the appearance of one multiple-pixel raster line. However, angular connection of individual rectangular lines such as the lines 10 as seen in FIG. 2 results in gaps 12 formed at the vertices of the intersection between such lines. The present invention particularly provides an algorithm which allows the generation of lines which more closely resemble lines produced by traditional drafting techniques. Such traditionally-produced lines such as are formed by drafting tools including reservoir pens and scribers have rounded ends. The present multi-stroked algorithm generates variable width lines which have rounded ends by varying the length of each stroke. Intersecting lines formed of variable-width lines 14 as seen in FIG. 3 and which have rounded ends do not have gaps at the vertices and are therefore much preferred in graphic situations including cartographic usage.

Referring now to FIG. 4, the method by which the lines 14 are generated is shown. The length of each stroke 16 forming each line 14 is varied by calculating plot coordinates Px1, Py1 and Px2, Py2 which lie upon the circumference of semicircles 18 and 20 centered about centerline end points 22 and 24. To calculate the plot of the end point Px1, Py1, and Px2, Py2, it is necessary to know the location of the centerline end points 22 and 24 which are represented by x1, y1 and x2, y2 respectively, the width of a single stroke W and the number of strokes necessary to generate as represented by NTIM. Working at one end of the centerline, the plot coordinates Px1, Py1 are found by:

$$Px1 = x1 + dX \text{ and}$$
$$Py1 = y1 + dY$$

The coordinate off-sets dX, dY are calculated by $$dX = R * \text{COSINE } c \text{ and}$$

$$dY = R * \text{SINE } c$$

where R is the radius of the "thickening" semicircle and c is the angle of the plot coordinates with respect to the centerline end coordinates. The radius R is found by $$R = 0.5 * NTIM * W$$

where NTIM is the number of strokes and W is the stroke width.

The angle c is found by $$c = (a - \pi) + b$$

where a is the absolute angle of the centerline and b is the relative angle of the plot coordinates Px1, Py1 measured from the centerline, extended. The angle a is found by $$a = \text{ARCTANGENT}(dY'/dX')$$

where $$dX' = x2 - x1 \text{ and}$$

$$dY' = y2 - y1$$

The relative angle b is found by $$b = \text{ARCSINE}(S/R)$$

where S is the distance of the generated plot coordinate from the centerline and R is the radius. The value of S or the length of the side opposite the relative angle b is calculated as $$S = 0.5 * ((2*T - NTIM - 1) * W)$$

where I is the incremented stroke count, NTIM is the number of strokes, and W is the stroke width. It should be noted that the calculation of S compensates for the difference between odd and even stroke counts, the generated strokes always exhibiting symmetry with respect to the vector centerline.

The above calculations take place at both ends of the centerline x1, y1, and x2, y2, and generate the plot coordinates Px1, Py1 and Px2, Py2 for each stroke 16. The total width of the multiply-stroked line 14 equals the width W multiplied by the number of strokes generated NTIM. The calculation can be changed such that the number of strokes NTIM equals the total width divided by the stroke width W, thereby permitting the generation of constant line widths regardless of available pen width. For aplications using raster output devices, the stroke width W is set to the step size between pixels. On devices such as the Laser Plate-maker, the step size is approximately 0.001 inch. For applications using vector output devices, the stroke width W is set to the actual "pen" width. The method is also useful in installations that have a limited selection of "pen" widths.

This algorithm thus developed is thus defined as follows:

SUBROUTINE LISTING

```
C*****************************************************************
      C-T     BLOCK DATA
      C-F     INITIALIZE COMMON BLOCK
      C-L     FORTRAN IV-PLUS V02.51
      C-S     RSX-11M VER 3.2         -OPERATING SYSTEM
      C-A     R. ROSENTHAL, USAETL, FT. BELVOIR, VIRGINIA   22060
      C-D     1-DEC-81
      C-R     LAST REVISION ON:  11-MAY-82
      C
              BLOCK DATA
              INTEGER NTIM      !LOCAL STROKE COUNT
              REAL DFLTPN       !DEFALT PEN WIDTH
              REAL PNWD         !LOCAL PEN WIDTH
      C
              COMMON /THICK1/ DFLTPN, NTIM, PNWD
      C
      C...    * VALUES MAY BE LOCALLY CONFIGURED
              DATA DFLTPN /0.005/      !DEFAULT PEN WIDTH *
              DATA NTIM   /1/          !INITIAL NUMBER OF STROKES *
              DATA PNWD   /0.005/      !INITIAL PENWIDTH *
      C
              END !OF BLOCK DATA
C*****************************************************************
      C-T     THICK
      C-F     PLOT SUBROUTINE FOR MULTIPLE-WIDTH LINES
      C-L     FORTRAN IV-PLUS V02.51
      C-S     RSX-11M VER 3.2         -OPERATING SYSTEM
      C-A     RICHARD ROSENTHAL, USAETL, FT. BELVOIR, VIRGINIA   22060
      C-D     1-DEC-81
      C-R     LAST REVISION ON:  11-MAY-82
      C
      C...    NOTE:  THIS ROUTINE IS DESIGNED TO BE CALLED IN THE SAME
      C...           MANNER AS 'PLOT'.  IT MAY BE SUBSTITUTED FREELY FOR
      C...           'PLOT' IN APPLICATIONS.  THE DEFAULT SETTINGS SIMPLY
      C...           GENERATE A SINGLE STROKE BY DIRECTLY CALLING 'PLOT'.
      C
      C...    ON-LINE COMMENTS (!) MAY BE COMPILER SPECIFIC
      C
      C       CALL THICK(X, Y, IPEN)
      C
      C               X = X-COORDINATE (REAL)
      C               Y = Y-COORDINATE (REAL)
      C               IPEN = FUNCTION CODE (INTEGER)
      C                    = +3 = MOVE TO (X,Y) - CALLS PLOT
      C                    = +2 = DRAW TO (X,Y)
      C                      ALL OTHER VALUES CALL PLOT
      C
      C       SUBROUTINES AND FUNCTIONS REFERENCED:
      C       PLOT    $ASIN    $ATAN    $COS     $SIN
      C
```

```
C       COMMON USED:  /THICK1/ NTIM, PNWD
C
        SUBROUTINE THICK(X, Y, IPEN)
C
        INTEGER I          !LOOP COUNTER
        INTEGER IP         !LOCAL PEN CODE
        INTEGER IPEN       !GLOBAL PEN CODE (PARAMETER)
        INTEGER NTIM       !LOCAL STROKE COUNT
        INTEGER PDOWN      !PEN DOWN
        INTEGER PUP        !PEN UP
C
        REAL AANG1         !ABSOLUTE ROTATION ANGLE AT START COORDINATE
        REAL AANG2         !ABSOLUTE ROTATION ANGLE AT END COORDINATE
        REAL DFLTPN        !DEFALT PEN WIDTH
        REAL DX            !DELTA X
        REAL DY            !DELTA Y
        REAL LINANG        !LINE ANGLE, UNCORRECTED FOR QUADRANTS
        REAL LNANG1        !LINE ANGLE, CORRECTED, START TO END
        REAL LNANG2        !LINE ANGLE, CORRECTED, END TO START
        REAL PI            !PIE
        REAL PNWD          !LOCAL PEN WIDTH
        REAL PX1           !PLOTTING START ABSCISSA, GENERATED
        REAL PX2           !PLOTTING END ABSCISSA, GENERATED
        REAL PY1           !PLOTTING START ORDINATE, GENERATED
        REAL PY2           !PLOTTING END ORDINATE, GENERATED
        REAL RADIUS        !RADIUS OF THICKENING CIRCLE
        REAL ROTX1         !ROTATED START ABSCISSA OFF-SET
        REAL ROTX2         !ROTATED END ABSCISSA OFF-SET
        REAL ROTY1         !ROTATED START ORDINATE OFF-SET
        REAL ROTY2         !ROTATED END ORDINATE OFF-SET
        REAL SLOPE         !SLOPE OF LINE FROM START TO END
        REAL S1            !SIDE OPPOSITE ANGLE AT START COORDINATE
        REAL S2            !SIDE OPPOSITE ANGLE AT END COORDINATE
        REAL TANG1         !RELATIVE ROTATION ANGLE AT START COORDINATE
        REAL TANG2         !RELATIVE ROTATION ANGLE AT END COORDINATE
        REAL X             !GLOBAL END ABSCISSA (PARAMETER)
        REAL X1            !LOCAL START ABSCISSA
        REAL X2            !LOCAL END ABSCISSA
        REAL Y             !GLOBAL END ORDINATE (PARAMETER)
        REAL Y1            !LOCAL START ORDINATE
        REAL Y2            !LOCAL END ORDINATE
C
        COMMON /THICK1/ DFLTPN, NTIM, PNWD
C
        DATA PDOWN   /2/         !PEN DOWN
        DATA PI      /3.14159/   !PIE
        DATA PUP     /3/         !PEN UP
        DATA X1      /0.0/       !LOCAL START ABSCISSA
        DATA Y1      /0.0/       !LOCAL START ORDINATE
C
C...    BEGIN
        X2 = X !LOCAL COPY
        Y2 = Y !LOCAL COPY
        IP = IPEN !LOCAL COPY
C
C...    SINGLE WIDTH LINE?
        IF (NTIM .EQ. 1) GOTO 190
```

```
C
C...       PEN DOWN MOVE?
           IF (IP .EQ. PDOWN) GOTO 100 !START ROUTINE
C
C...       PEN UP MOVE?
           IF (IP .EQ. PUP) GOTO 190
C
C...       UNDEFINED PEN CODE
           GOTO 190
C
100        CONTINUE
C...       PEN-DOWN MULTIPLE-WIDTH LINE
           DX = X2 - X1 !DELTA X = END - START
           DY = Y2 - Y1
           IF ((DX .EQ. 0.0) .AND. (DY .EQ. 0.0)) GOTO 190 !NO MOVEMENT
           IF (DX .NE. 0.0) GOTO 110
C...       MANUAL CALCULATION WHEN DX = 0.0
           LINANG = -PI/2 !FOLLOWS F4P $ATAN CONVENTION
           GOTO 115
C
110        CONTINUE
           SLOPE = DY/DX
           LINANG = ATAN(SLOPE) !LINANG = ARCTANGENT(SLOPE)
C
115        CONTINUE
C...       THE FOLLOWING CODE PLACES ANGLE IN PROPER QUADRANT
C...       AND MAY BE NECESSARY ONLY DUE TO DEC CALCULATION OF 'ATAN'.
C...       THIS IS NOT CERTAIN.
           IF ((DX .GT. 0.0) .AND. (DY .GE. 0.0)) GOTO 119 !QUAD 1
           IF ((DX .LE. 0.0) .AND. (DY .GT. 0.0)) GOTO 118 !QUAD 2
           IF ((DX .LT. 0.0) .AND. (DY .LE. 0.0)) GOTO 117 !QUAD 3
C
116        CONTINUE !CORRECT ANGLE FOR LINE GOING INTO QUAD 4
           LNANG1 = LINANG + (2 * PI)
           LNANG2 = LINANG + PI
           GOTO 120
C
117        CONTINUE !CORRECT ANGLE FOR LINE GOING INTO QUAD 3
           LNANG1 = LINANG + PI
           LNANG2 = LINANG
           GOTO 120
C
118        CONTINUE !CORRECT ANGLE FOR LINE GOING INTO QUAD 2
           LNANG1 = LINANG + PI
           LNANG2 = LINANG + (2 * PI)
           GOTO 120
C
119        CONTINUE !CORRECT ANGLE FOR LINE GOING INTO QUAD 1
           LNANG1 = LINANG
           LNANG2 = LINANG + PI
120        CONTINUE !LINE ANGLES ARE NOW CORRECTED
C
C...       ONE OF TWO RADIUS CALCULATIONS ARE POSSIBLE:
C...       THE FIRST CALCULATION GIVES THE PREFERED GRAPHIC RESULT.
           RADIUS = 0.5 * (NTIM - 1) * PNWD
C-O        RADIUS = 0.5 * NTIM * PNWD !0.5 * NUMBER OF STROKES * PEN WIDTH
C
```

```
              DO 130 I = 1, NTIM !ONE LOOP FOR EACH PEN STROKE
C...          CALCULATE LENGTH OF SIDE OPPOSITE RELATIVE ROTATION ANGLE
              S1 = 0.5 * ((2 * I - NTIM - 1) * PNWD) !AT START POINT
              S2 = -S1 !AT END POINT
C
C...          CALCULATE RELATIVE ROTATION ANGLE
              TANG1 = ASIN(S1 / RADIUS) !AT START POINT
              TANG2 = ASIN(S2 / RADIUS) !AT END POINT
C
C...          CALCULATE ABSOLUTE ROTATION ANGLE
              AANG1 = (LNANG1 - PI) + TANG1 !AT START POINT
              AANG2 = (LNANG2 - PI) + TANG2 !AT END POINT
C
C...          CALCULATE ROTATED START COORDINATE OFF-SET
              ROTX1 = RADIUS * COS(AANG1)
              ROTY1 = RADIUS * SIN(AANG1)
C
C...          CALCULATE ROTATED END COORDINATE OFF-SET
              ROTX2 = RADIUS * COS(AANG2)
              ROTY2 = RADIUS * SIN(AANG2)
C
C...          CALCULATE PLOTTING START COORDINATE
              PX1 = X1 + ROTX1 !PLOTTING = START + OFF-SET
              PY1 = Y1 + ROTY1
C
C...          CALCULATE PLOTTING END COORDINATE
              PX2 = X2 + ROTX2 !PLOTTING = END + OFF-SET
              PY2 = Y2 + ROTY2
C
C...          DRAW FROM GENERATED START TO GENERATED END COORDINATE
              CALL PLOT(PX1, PY1, PUP) !GRAPHIC MOVE
              CALL PLOT(PX2, PY2, PDOWN) !GRAPHIC DRAW
130           CONTINUE !DO ANOTHER STROKE
C
              IP = PUP !PEN UP
C
190           CONTINUE
C...          UPDATE LOCAL START COORDINATE
              X1 = X2 !NEW START = OLD END
              Y1 = Y2
C
C...          UPDATE DEVICE PLOT ROUTINES
              CALL PLOT(X2, Y2, IP)
C
              RETURN
              END !OF THICK SUBROUTINE
C*********************************************************************
C-T    STROKE
C-F    PLOT SUBROUTINE TO SET NUMBER OF PEN STROKES
C-L    FORTRAN IV-PLUS V02.51
C-S    RSX-11M VER 3.2            -OPERATING SYSTEM
C-A    R. ROSENTHAL, USAETL, FT. BELVOIR, VIRGINIA   22060
C-D    1-DEC-81
C-R    LAST REVISION ON:  11-MAY-82
C
C      CALL STROKE(NTIMES)
```

```
C
C              NTIMES = NUMBER OF PEN STROKES PER LINE (INTEGER)
C
C      COMMON MODIFIED:  /THICK1/ NTIM
C
       SUBROUTINE STROKE(NTIMES)
C
       INTEGER NTIM      !LOCAL STROKE COUNT
       INTEGER NTIMES    !GLOBAL STROKE COUNT (PARAMETER)
C
       REAL DFLTPN       !DEFALT PEN WIDTH
       REAL PNWD         !LOCAL PEN WIDTH
C
       COMMON /THICK1/ DFLTPN, NTIM, PNWD
C
C...   BEGIN
       NTIM = NTIMES !LOCAL COPY
       IF(NTIM .LT. 1) NTIM = 1 !SAFTY CHECK
       RETURN
       END !OF STROKE SUBROUTINE
C***************************************************************
C-T    PEN
C-F    PLOT SUBROUTINE TO SET WIDTH OF PLOTTER PEN
C-L    FORTRAN IV-PLUS V02.51
C-S    RSX-11M VER 3.2           -OPERATING SYSTEM
C-A    R. ROSENTHAL, USAETL, FT. BELVOIR, VIRGINIA  22060
C-D    1-DEC-81
C-R    LAST REVISION ON:  11-MAY-82
C
C      CALL PEN(PENWID)
C
C              PENWID = WIDTH OF PLOTTER PEN (REAL)
C
C      COMMON USED:  /THICK1/ DFLTPN
C      COMMON MODIFIED:  /THICK1/ PNWD
C
       SUBROUTINE PEN(PENWID)
C
       INTEGER NTIM      !LOCAL STROKE COUNT
C
       REAL DFLTPN       !DEFALT PEN WIDTH
       REAL PENWID       !GLOBAL PEN WIDTH (PARAMETER)
       REAL PNWD         !LOCAL PEN WIDTH
C
       COMMON /THICK1/ DFLTPN, NTIM, PNWD
C
C...   BEGIN
       PNWD = PENWID !LOCAL COPY
       IF(PNWD .LE. 0.0) PNWD = DFLTPN !SAFTY CHECK
       RETURN
       END !OF PEN SUBROUTINE
```

The invention thus provides the ability to produce lines of differing width as is commonly required in automated map image generation. In those particular situations wherein graphic devices include hardware unable to allow selection of line width, line widths must be generated by software simulation such as according to the present invention. High resolution devices particularly require the generation of lines through software simulation which have minimum associated with cartographic symbolization standards. On those devices where hardware line width selection is available but limited, a variable-width routine provides additional capability through the use of the present digital technique for constructing variable-width lines based on multiply-stroked centerline data. It is to be understood that the invention can be practiced other than as is explicitly described hereinabove, the scope of the invention being defined by the appended claims.

What is claimed is:

1. A method of constructing a line having rounded ends by use of a machine, comprising the steps of:
   a. forming at least one centermost stroke of predetermined length; and
   b. forming a plurality of side strokes on either side of said centermost stroke, each said side stroke being incrementally shorter in length than said centermost stroke and all other inwardly adjacent side strokes and each said side stroke being varied by calculating plot coordinates Px1, Py1 and Px2, Py2 lying upon the circumference of a semicircle at each end of the line, the semicircles being centered about the respective end points of the centermost stroke of the line.

2. The method of claim 1 wherein each said side stroke is substantially equal in length to a corresponding side stroke located on the opposite side of said centermost stroke.

3. The method of claim 2 wherein said corresponding side strokes are located substantially equidistant from said centermost stroke.

4. The method of claim 1 wherein said centermost strokes are substantially equal in length.

5. The method of claim 1 wherein the plot coordinates are located by the following steps:
   a. determining the end points of the centermost stroke;
   b. selecting the width of each side stroke and the width of each centermost stroke;
   c. selecting the number of centermost strokes and side strokes used to form the line; and
   d. forming the semicircles.

6. The method of claim 5 wherein the end points of the centermost stroke are represented by X1, Y1 and X2, Y2 respectively and the plot coordinates are represented respectively by Px1=x1+dx, Py1=y1+dy and Px2=x2+dx, Py2=y2+dy where $$dx = R \cos C$$

and $$dy = R \sin C$$

and where R is the radius of the semicircles and C is an angle formed between a line, formed between the plot coordinates and the end points, and an X-axis, the radius R being determined by one-half the distance between the outer edges of the two outermost side strokes.

7. The method of claim 6 wherein the angle C is determined by:

$$C = (a - \pi) + b$$

where a is an angle formed between a centerline, formed by the line between end points x1, y1 and x2, y2, and the x-axis and where b is an angle formed between a radius line passing through the plot coordinates and the centerline where the angle a is found by $$a = 180° - \text{ARCTAN}(dy'/dx')$$

where $dx' 32\ x2 - x1$ and $dy' = y2 - y1$ and the angle b is found by $$b = \text{ARC SIN}(S/R)$$

where S is the perpendicular distance from the plot coordinates to the centerline and R is the distance from the plot coordinates to the end point.

8. The method of claim 6 where R is determined by $$R = \frac{1}{2} * NTIM * W$$

where NTIM is the number of centermost strokes and side strokes and W is the width of each stroke.

9. The method of 8 wherein the value of S is found by:

$$S = \frac{1}{2} * [(2*I - NTIM - 1) * W]$$

where I is the incremented stroke count.

10. A method for constructing a line having rounded ends by use of a machine, comprising the steps of:
   a. forming at least one centermost stroke of predetermined length;
   b. forming a plurality of first strokes adjacent said centermost stroke, each said first stroke being shorter in length than said centermost stroke and any other inwardly adjacent first stroke;
   c. forming a plurality of second strokes adjacent said centermost stroke, each said second stroke being shorter in length than said centermost stroke and any other inwardly adjacent second stroke, said first strokes being on the opposite side of said centermost line from said second strokes; and
   d. varying the length of each said first and second side stroke by calculating plot coordinates Px1, Py1 and Px2, Py2 lying upon the circumference of a semicircle at each end of the line, the semicircles being centered about the respective end points of the centermost stroke of the line.

11. The method of claim 10 wherein the step of forming a plurality of first strokes includes incrementally decreasing the length of each said first stroke from an innermost first stroke outwardly to an outermost first stroke.

12. The method of claim 10 wherein the step of forming a plurality of second strokes includes incrementally decreasing the length of each said second stroke from an innermost second stroke outwardly to an outermost second stroke.

13. The method of claim 10 wherein each said first stroke is substantially equal in length to a corresponding second stroke.

14. The method of claim 13 wherein said corresponding first and second strokes are located substantially equidistant from said centermost stroke.

15. The method of claim 10 wherein said centermost strokes are substantially equal in length.

16. The method of claim 10 wherein the plot coordinates are located by the following steps:

a. determining the end points of the centermost stroke;
b. selecting the width of each first and each second side stroke and the width of each centermost stroke;
c. selecting the number of centermost strokes, first side strokes and second side strokes used to form the line; and
d. forming the semicircles.

17. The method of claim 16 wherein the end points of the centermost strokes are represented by x1, y1 and x2, y2 respectively and the plot coordinates are represented respectively by Px1=x1+dx, Py1=y1+dy and Px2=x2+dx, Py2=y2+dy where $$dx = R \cos C$$

and $$dy = R \sin C$$

and where R is the radius of the semicircle and C is an angle formed between a line, formed between the plot coordinates and the end points, and an X-axis, the radius R being determined by one-half othe distance between the outer edges of the outermost first and second side strokes 18. The method of claim 17 wherein the angle C is determined by:

$$C = (a - \pi) + b$$

where a is an angle formed between a centerline, formed by the line between end ponts x1, y1 and x2, y2, and the x-axis and b is an angle formed between a radius line passing through the the plot coordinates and the centerline
where the angle a is found by $$a = 180° - \text{ARCTAN}(dy'/dx')$$

where $$dx' = x2 - x1 \text{ and}$$

$$dy' = y2 - y1$$

and the angle b is found by $$b = \text{ARC SIN}(S/R)$$

where S is the perpendicular distance from the plot coordinates to the centerline and R is the distance from the plot coordinates to the end point.

19. The method of claim 18 wherein R is determined by $$R = \frac{1}{2} * NTIM * W$$

where NTIM is the number of centermost strokes, first strokes, and second strokes and W is the width of each stroke.

20. The method of claim 18 wherein the value of S is found by $$S = \frac{1}{2} * [2*I - NTIM - 1] * W]$$

where I is the incremented stroke count.

* * * * *